June 14, 1938.    M. D. STONE    2,120,316
APPARATUS FOR WELDING AND FLASH TRIMMINGS
Filed April 3, 1937

INVENTOR
Morris D. Stone
BY
Brown, Critchlow & Flick
his ATTORNEYS

Patented June 14, 1938

2,120,316

UNITED STATES PATENT OFFICE 2,120,316

APPARATUS FOR WELDING AND FLASH TRIMMINGS

Morris D. Stone, Pittsburgh, Pa., assignor to United Engineering & Foundry Company, Pittsburgh, Pa., a corporation of Pennsylvania Application April 3, 1937, Serial No. 134,821

12 Claims. (Cl. 29—33)

This invention relates to methods and apparatus for welding metal strip end to end and for trimming the flash or burr produced at the line of weld.

It is the general object of my invention to provide improved methods and apparatus for welding metal strip end to end and for trimming the flash from the weld which methods and apparatus are particularly adapted to commercial production operations and are readily operated by workmen in a rapid and effective manner and in which the initial and maintenance costs are relatively low.

Another object of my invention is to provide methods and apparatus for welding strip end to end and by which the flash at the line of weld is trimmed while the strip is held stationary.

Another object of my invention is the provision of methods and apparatus for butt-welding metal strips of slightly different thicknesses end to end and flash trimming the resulting weld in the most effective direction while taking into consideration the difference in thickness of the metal strips.

The foregoing and other objects of my invention are achieved by the provision of apparatus comprising the combination of means for cutting the strip ends at the desired transverse angle to prepare them for welding, means for butt-welding the strip ends together and means for moving the strip longitudinally to a flash trimming position. Completing the combination are means for clamping the strip in the flash trimming position, flash trimming means, means for bringing the flash trimming means into working relation with opposite sides of the strip and means for moving the flash trimming means away from the clamping means while in working relation with the strip to sever the flash from the strip.

The improved method of my invention includes the steps of shearing the ends of the strip at the desired transverse angle to prepare them for welding, butt-welding the strip ends together and moving the strip longitudinally to a flash trimming position. The strip is clamped at the flash trimming position and flash trimming means are brought into flash working proximity with opposite sides of the strip adjacent the line of weld and the flash trimming means are moved away from the point at which the strip is clamped and longitudinally of the strip to sever the flash from the line of weld.

Figure 1:
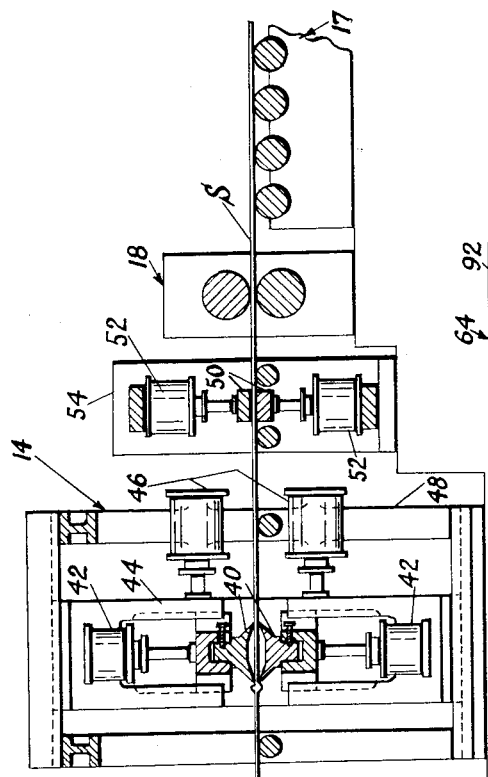
Figure 2:
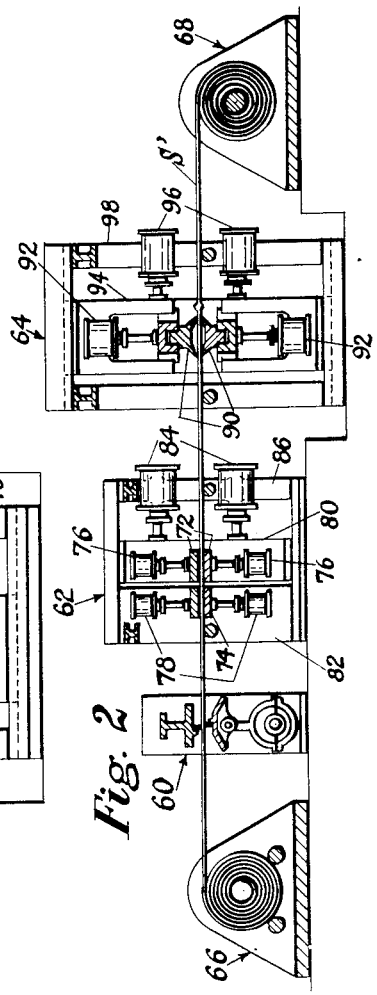
Figure 3:
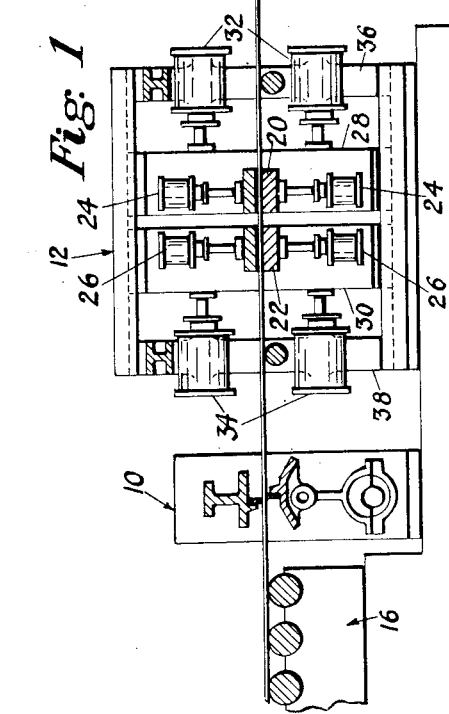
Figure 4:
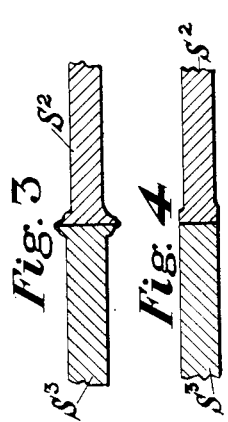
Figure 5:
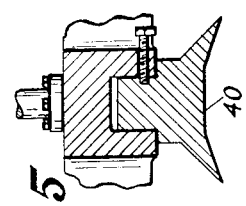

For a better understanding of my invention reference should be had to the accompanying drawing wherein Fig. 1 is a longitudinal vertical sectional view through diagrammatically illustrated apparatus embodying one form of my invention; Fig. 2 is a view similar to Fig. 1 but of another embodiment of my invention; Fig. 3 is a longitudinal vertical sectional view through the line of weld before the flash has been trimmed therefrom; Fig. 4 is a view similar to Fig. 3 but illustrates the line of weld after the flash has been removed; and Fig. 5 is an enlarged cross-sectional view of a flash trimming means forming a part of my inventive concept.

The embodiment of my invention diagrammatically illustrated in Fig. 1 includes a shear 10, a welder 12, a flash removing mechanism 14 and means for supplying metal strip to and removing it from the several apparatus. This last referred to means may take a variety of forms but in the embodiment of my invention illustrated have been shown as comprising conveyors 16 and 17, and pinch rolls 18 adapted to handle strip marked S.

The shear 10 is adapted to cut the ends of the strip at any desired transverse angle, as for example, an angle of 90° relative to the longitudinal axis of the strip or the transverse cut may make a greater or less angle than 90° with the longitudinal axis. The leading end of one strip and the trailing end of the other may be overlapped and sheared simultaneously at the desired angle or they can be cut separately. Since the details of a shear of the type generally illustrated and described are old and well known and form no part of my inventive combination they have not been shown nor will they be described in detail.

The welder, indicated generally by the numeral 12, may comprise any preferred type of apparatus capable of butt-welding metal strip end to end, but since electric flash butt-welding produces probably the largest flash or burr of any of the several known methods an electric flash welder has been diagrammatically shown. More specifically, the welder illustrated includes clamps 20 and 22 which also serve as means for conducting electric current into the ends of the strip, which clamps are operable by suitable means, such as air motors 24 and 26, to move the clamps into engagement with opposite sides of the strip ends. The air motors 24 and 26 are mounted upon frames 28 and 30 carrying them for movement to and from each other to thereby engage the ends of the strips with each other and perform the usual welding operation. The frames 28 and 30 can be moved toward and from each other in any of several different ways, as for example, by the provision of air motors 32 and 34 carried upon housings 36 and 38.

The flash trimming mechanism shown generally at 14 includes a pair of flash trimming means 40 which in the embodiment of the invention shown comprise blades or knives having a straight, curved or V-shaped cutting edge and adapted to sever the flash from the line of weld by movement longitudinally of the strip. It is part of my inventive concept to use flash trimming means which are of a universal type, that is, formed with a cutting edge on both sides as shown in the drawing and particularly Fig. 5. This allows the flash trimming cut to be made by either a pulling or a pushing operation and likewise permits the knives to be turned end for end to present a fresh cutting edge when the knife is only operated in one direction. The flash trimming means 40 are adapted to be moved to and from working relation with opposite sides of the strip S and this may be accomplished by the provision of air motors 42 carried upon a frame 44. The frame 44 and flash trimming means 40 are adapted to be moved longitudinally of the strip S as a unit and this is achieved, in the embodiment of my invention illustrated, by providing air motors 46 which are secured to a housing 48.

Associated with the flash trimming mechanism just described is means for holding the strip at the flash trimming position. This means may comprise clamps 50 mounted for movement into clamping relation with opposite sides of the strip, as for example, by air motors 52 supported upon a housing 54.

The pinch rolls 18 comprise means for moving the strip through the apparatus and the conveyors 16 and 17 are of any standard or desired type serving to bring the strip to and carry it from the apparatus so that the strip before and after being welded end to end can be treated as desired.

In the operation of the embodiment of my invention just described the trailing strip end S and the leading strip end of a length of strip to be added are positioned relative to the shear 10 and the desired transverse cut is made to prepare the strip ends to be welded together. The strip ends are now moved into the welder where they are gripped by the clamps 20 and 22. The current is fed to the clamps and the air cylinders 32 and 34, or either set alone, are energized to bring the strip ends together and flash weld them. Now the strip is moved, as for example, by operating the pinch rolls 18 to move the line of weld to the flash trimming mechanism 14. When in this position the clamps 50 are operated to hold the strip against longitudinal movement and the air motors 42 are actuated to bring the shear trimming means 40 into working relation on opposite sides of the strip. The air motors 46 are now energized to move the frame 44 and the flash trimming means 40 longitudinally of the strip and across the line of weld of the strip ends. It will be understood that this movement which is away from the clamping means 50 first brings the flash trimming means 40 into engagement with the flash and continued movement severs it from the line of weld. The air motors 42 and 50 are then operated in the reverse direction to release the strip which is then advanced by the pinch rolls 18 and the entire operation is repeated as often as desired.

In the embodiment of my invention illustrated in Fig. 2 the combination includes a shear 60, a welder 62, a flash trimming mechanism 64, an uncoiler 66, and a coiler 68 operable upon strip S'.

I may employ a combined shear and welding apparatus in which the shearing of the strip ends and the welding operation are facilitated with the use of cooperating aligning and clamping mechanism so that the ends of the strips can be sheared with the desired transverse cuts and thereafter welded together without disturbing the relation of the strip ends. Apparatus of the general type described which I may employ to form a part of the combination of the apparatus comprising my inventive concept is illustrated in the application of Florence C. Biggert, Jr., and Charles F. Buente, Serial No. 34,912, filed August 6, 1935, and entitled Means and methods for making strip. However, in the embodiment of my invention shown in Fig. 2 I have diagrammatically illustrated a shear 60 similar to the shear 10 heretofore described and a welder 62 of the electric flash welding type.

The welder 62 includes clamps 72 and 74 adapted to engage the ends of the strips to be welded together and serving also to carry the electric current thereto, all in accordance with known constructions. The clamps 72 and 74 are adapted to be moved into and out of engagement with the strip ends and this may be accomplished by the use of air motors 76 and 78 carried, respectively, by a frame 80 and a housing 82. While the housing 82 is supported upon the floor or other suitable fixed foundation, the frame 80 is mounted for movement to and from the housing 82. In the form of my invention illustrated means for achieving the desired mounting include air motors 84 carried by a standard 86 supported upon the floor or foundation of the apparatus.

The flash trimming mechanism 64 includes flash trimming means 90 which may take a plurality of forms but which ordinarily comprise straight or plow-knives having horizontal cutting edges such as will sever the flash from the line of weld when moved longitudinally of the strip while in working relation therewith. The flash trimming means 90 are mounted for movement to and from the opposite sides of the strip S' and to this end air motors 92 are provided upon a frame 94. In order to move the frame 94 longitudinally of the strip to effect the desired flash trimming operation I provide air motors 96 or other suitable means which are carried upon a standard 98 fixed to the foundation or floor.

The operation of the embodiment of my invention illustrated in Fig. 2 is substantially identical to that above described in conjunction with Fig. 1. The only important difference between the operation of the two embodiments of my invention illustrated is that in the form shown in Fig. 2 the air motors 96 of the flash trimming mechanism move the flash trimming means 90 longitudinally of the strip which is held by the clamps 72 and 74 of the welder, whereas in Fig. 1 additional clamps 50 are provided and the flash trimming means 40 are again moved away from the clamps but toward the welder.

I have found that the particular direction of flash trimming movement is often important. This is because in rolling metal strip the trailing end of the strip is usually somewhat thicker than the leading end of the strip. This has been particularly illustrated in Fig. 3 in which the strip $S^2$ is somewhat thinner than the strip end $S^3$. The strip ends, after the flash has been trimmed therefrom, are shown in Fig. 4. When the flash is trimmed by a cut starting at the thickest end of the strip and extending to the thinner end of another length of strip there is no danger of jamming the trimming knives by attempting to plane off the thicker strip. This preferred flash trimming movement is that illustrated in Fig. 1 of the drawing assuming that the strip is fed to the apparatus from the rolling mills with or without intermediate operations but without reversing the strip end for end. Coiling the strip after rolling may reverse the strip end for end so that in the operation of the embodiment shown in Fig. 2 the flash trimming operation can still be made from the thicker to the thinner strip end.

I have found that under certain conditions where the difference in thickness of the strip ends is relatively small or where softer metals are operated on that the flash trimming cut can be made from the thinner to the thicker strip end with a greater percentage of the flash being removed from the line of weld.

From the foregoing it will be evident that the objects of my invention have been achieved by the provision of improved methods and apparatus for welding metal strips end to end and thereafter trimming the flash from the weld. The methods and the operation of the apparatus herein disclosed can be quickly and effectively performed by the workman and initial and maintenance costs of the apparatus are relatively low. The strip is held in a flat, smooth, stationary position during the flash trimming operation and the flash can be trimmed either from the thicker strip end to the thinner or vice versa with a straight longitudinal cut.

While in accordance with the patent statutes several embodiments of my invention have been illustrated and described in detail, it should be understood that my invention is not limited thereto or thereby but is defined in the appended claims.

I claim:

1. Apparatus for welding metal strips end to end comprising the combination of means for cutting the strip ends off at the desired angle to prepare them for welding, means for butt-welding the strip ends together, means for moving the strip longitudinally to a flash trimming position, means for clamping the strip in the flash trimming position, flash trimming means, means for bringing the flash trimming means into working relation with the strip, and means for moving the flash trimming means away from the clamping means while in working relation with the strip to sever the flash from the strip.

2. Apparatus for welding metal strips of slightly different thickness end to end comprising the combination of means for cutting the strip ends off at the desired angle to prepare them for welding, means for butt-welding the strip ends together, means for moving the strip longitudinally to a flash trimming position, means for clamping the strip in the flash trimming position, flash trimming means, means for bringing the flash trimming means into working relation with opposite sides of the strip, and means for moving the flash trimming means from the thicker strip end towards the thinner strip end while in working relation with the strip to sever the flash from the strip.

3. Apparatus for welding metal strips end to end comprising the combination of means for cutting the strip ends off at the desired angle to prepare them for welding, means for butt-welding the strip ends together, means for moving the strip longitudinally to a flash trimming position, means for clamping the strip in the flash trimming position, flash trimming means, means for bringing the flash trimming means into working relation with opposite sides of the strip, and means for moving the flash trimming means toward the welder while in working relation with the strip to sever the flash from the strip.

4. Apparatus for welding metal strips end to end comprising the combination of means for cutting the strip ends off at the desired angle to prepare them for welding, means for butt-welding the strip ends together, means for moving the strip longitudinally to a flash trimming position, means for clamping the strip in the flash trimming position, flash trimming means, means for bringing the flash trimming means into working relation with opposite sides of the strip, and means for moving the flash trimming means away from the welder while in working relation with the strip to sever the flash from the strip.

5. Apparatus for welding metal strips of slightly different thickness end to end comprising the combination of means for butt-welding the strip ends together, means for moving the strip longitudinally to a flash trimming position, means for clamping the strip in the flash trimming position, flash trimming means, means for bringing the flash trimming means into working relation with the strip, and means for moving the flash trimming means from the thicker strip end towards the thinner strip end while in working relation with the strip to sever the flash from the strip.

6. Apparatus for welding metal strips end to end comprising the combination of means for butt-welding the strip ends together, means for moving the strip longitudinally to a flash trimming position, means for clamping the strip in the flash trimming position, flash trimming means, means for bringing the flash trimming means into working relation with the strip, and means for moving the flash trimming means away from the welder while in working relation with the strip to sever the flash from the strip.

7. Apparatus for welding metal strips end to end comprising the combination of means for butt-welding the strip ends together, means for moving the strip longitudinally to a flash trimming position, means including clamps in the welding means for clamping the strip in the flash trimming position, flash trimming means, means for bringing the flash trimming means into working relation with opposite sides of the strip, and means for moving the flash trimming means away from the welder while in working relation with the strip to sever the flash from the strip.

8. Apparatus for welding metal strips end to end comprising the combination of means for butt-welding the strip ends together, means for moving the strip longitudinally to a flash trimming position, means for clamping the strip in the flash trimming position, flash trimming means, means for bringing the flash trimming means into working relation with opposite sides of the strip, and means for moving the flash trimming means toward the welder while in working relation with the strip to sever the flash from the strip.

9. Apparatus for welding metal strip end to end comprising means for cutting the strip ends off at the desired angle to prepare them for welding, means for butt-welding the strip ends together, means for effecting relative movement between the welding means and the strip, flash trimming means, means for bringing the flash trimming means into working relation with the strip, means for holding the strip against movement, and means for moving the flash trimming means over the strip to trim the flash therefrom.

10. Apparatus for welding metal strip end to end comprising means for cutting the strip ends off at the desired angle to prepare them for welding, means for butt-welding the strip ends together, flash trimming means, means for bringing the flash trimming means into working relation with the strip, means for holding the strip against movement, and means for moving the flash trimming means over the strip to trim the flash therefrom.

11. In apparatus for welding metal strip end to end the combination of means for butt-welding the strip ends together, a cutting blade having two opposed cutting edges so that the blade will cut on either a push or pull, means mounting the blade so that it can be turned end for end, means for moving the cutting blade into working relation with the strip, and means for effecting relative movement between the strip and the blade to sever the flash from the line of weld.

12. In apparatus for welding metal strip end to end the combination of means for butt-welding the strip ends together, means for holding the welded strip during a flash trimming operation, a cutting blade having two opposed horizontal cutting edges so that the blade will cut on either a push or pull, means mounting the blade so that it can be turned end for end, means for moving the cutting blade into working relation with the strip, and means for moving the blade longitudinally of the strip to sever the flash from the line of weld.

MORRIS D. STONE.